(12) United States Patent
van Rijn

(10) Patent No.: US 7,669,333 B2
(45) Date of Patent: Mar. 2, 2010

(54) METHOD FOR PROVIDING ATTACHMENTS BETWEEN A CONCRETE PART TO A FURTHER PART

(75) Inventor: Robertus Cornelis Maria van Rijn, Vinkeveen (NL)

(73) Assignee: Connector Vinkeveen B.V., Vinkeveen (NL)

( * ) Notice: Subject to any disclaimer, the term of this patent is extended or adjusted under 35 U.S.C. 154(b) by 1109 days.

(21) Appl. No.: 10/519,273

(22) PCT Filed: Jun. 27, 2003

(86) PCT No.: PCT/NL03/00477
§ 371 (c)(1),
(2), (4) Date: Aug. 16, 2005

(87) PCT Pub. No.: WO2004/002701
PCT Pub. Date: Jan. 8, 2004

(65) Prior Publication Data
US 2006/0080932 A1    Apr. 20, 2006

(30) Foreign Application Priority Data
Jun. 27, 2002    (NL) .................................... 1020949

(51) Int. Cl.
*B21D 47/00* (2006.01)
(52) U.S. Cl. ................... 29/897.34; 264/279.1
(58) Field of Classification Search ............... 29/897.34, 29/428; 264/279.1

See application file for complete search history.

(56) References Cited

U.S. PATENT DOCUMENTS

| 4,003,545 | A | * | 1/1977 | Tanaka ..................... 249/112 |
| 4,074,499 | A | | 2/1978 | Mess |
| 4,084,780 | A | | 4/1978 | Mess |
| 6,688,071 | B1 | * | 2/2004 | Evers et al. ................. 403/307 |

FOREIGN PATENT DOCUMENTS

| BE | A-502 991 | 5/1951 |
| DE | 43 24 522 | 1/1995 |
| GB | A-151 692 | 9/1920 |
| GB | 682320 | 3/1950 |
| JP | 04298302 | 10/1992 |

* cited by examiner

*Primary Examiner*—David P Bryant
*Assistant Examiner*—Ryan J Walters
(74) *Attorney, Agent, or Firm*—The Webb Law Firm

(57) ABSTRACT

A method for providing a connection between concrete parts. One of the concrete parts is provided with a number of encased, projecting reinforcing bars. The other concrete part is provided with a series of cavities in which said reinforcing bars are placed and are then fixed to the concrete part in question by being encased. The cavities are produced by encasing a body, which at least on the outside comprises a polysiloxane material, in the concrete. When a tensile force is applied to the body a considerable reduction in its cross section takes place, so that it is possible for the non-sticking body to be removed from the concrete in a simple way, after which the desired cavity remains.

14 Claims, 3 Drawing Sheets

METHOD FOR PROVIDING ATTACHMENTS BETWEEN A CONCRETE PART TO A FURTHER PART

BACKGROUND OF THE INVENTION

1. Field of the Invention

The present invention relates to method for arranging a cavity in a concrete part. A method of this type is known from Belgium patent 502991. This patent describes the production of a cavity by the introduction of an elastomeric material into a formwork. This rubber elastomeric material extends through the boundary wall of the formwork. At the location where it passes through the formwork, the rubber elastomeric material forms an acute angle, so that a larger cavity is formed as a result of the formwork wall being provided with a number of auxiliary parts at that location. After the concrete has been poured, the rubber elastomeric material is removed and a stay or cable is arranged in the cavity formed in this way and tensioned by coupling parts which act on it from the outside.

2. Description of Related Art

GB 682320 discloses a method for providing an elongated cavity in a concrete article for receiving reinforcement elements such as a number of wires, which might be highly tensioned to form a pre-stressed beam or girder.

SUMMARY OF THE INVENTION

It is an object of the present invention to make it easier to couple concrete parts and other parts to one another. In the prior art, concrete parts are coupled to one another by a concrete part being provided with projecting (threadable) reinforcing bars (dowels and plug-connection anchors) and the other concrete part is provided with cavities which match them. After they have been put together, the space between the concrete bars and the cavities in the concrete part are poured full of concrete. These cavities are produced by fitting pipes into the formwork before the concrete is poured. After the concrete has been poured out, these pipes remain behind in the formwork. This firstly entails considerable costs, since the pipes have to be considered lost, meaning considerable outlay. Secondly, bonding takes place between the concrete and the pipes and between the pipes and the reinforcing bar.

The object of the present invention is to provide a method of this type which enables a concrete part to be secured to the surroundings.

According to one aspect of the present invention, this object is realised in a method for securing a metal part in a concrete part, comprising the steps of providing a concrete part having a cavity which extends from an outer wall thereof of providing a formwork, of placing a body into said formwork, the shape of which body at least partially corresponds to said cavity and that side of which body that adjoins the concrete material comprising an elastomer material, the mechanical properties of said body being such that, when a tensile force is applied to said body in the vicinity of said boundary surface, the diameter of said body is considerably reduced, with the result that said body, after the concrete has been poured and at least partially set, can be removed from said shaped cavity, which diameter of said body can be elastically reduced, of pouring and at least partially setting the concrete, detaching said formwork and said body and securing said metal part in said cavity.

The length (depth) of the cavity produced in this way is preferably at least 20 cm.

This securing may comprise "adhesive bonding" in accordance with an advantageous embodiment. The term adhesive bonding is understood as meaning the use of all types of adhesive materials which provide a connection between the metal part which has been introduced into the cavity and the concrete wall of the cavity. The wall of the cavity is preferably profiled in order to improve adhesion. The same is true of the outer side of the metal part.

According to another aspect of the present invention, this object is achieved by a method for arranging a series of cavities, which extend as far as an outer wall of a concrete part, in said concrete part, comprising the steps of providing a formwork, placing a series of bodies into said formwork, the mechanical properties of each body being such that when a tensile load is applied to said body, there is a considerable reduction in the diameter of the body in the vicinity of said boundary surface, with the result that said body can be removed from said shaped cavity, which reduction in diameter of said body is elastic, each cavity comprising a blind hole which is delimited only by said body and the boundary wall which, in the vicinity of the body-boundary wall contact surface, extends substantially perpendicular to the longitudinal extent of said body.

The invention also relates to a concrete part which is to be coupled to a further concrete part, comprising, at the boundary surface with said further concrete part a series of cavities which extend substantially perpendicular to said boundary surface, the boundary wall of said cavities comprises concrete. The invention also relates to an assembly comprising two concrete parts secured to one another, comprising a concrete part as described above and a further concrete part which is provided, at the boundary surface with the concrete part, with a series of projecting reinforcing bars which, in the coupled state to said concrete part, extend into the cavities in said concrete part, the space between said cavities and said reinforcing bars being filled with a material which bonds said reinforcing bars to said concrete body.

The reinforcing bars in the further concrete part may be encased therein, but it is also possible for them to be fitted into cavities which have been produced in the manner described above. Cavities of this type may have a smooth wall, but are preferably profiled to some degree in order to improve bonding to a reinforcing bar or the like when, for example, adhesive is used. However, it is also possible for a cavity of this type to be provided with a screw thread, so that the reinforcing bar or threaded part can be screwed into the corresponding cavity.

The invention proposes positioning a body in the formwork and removing the body again after the (partial) setting of the concrete. Unlike in known structures, at least the outer side of this body is made from an elastomer material. The properties of the body are such that when a tensile force is applied thereto, during removal, the cross section (diameter) of said body becomes considerably smaller. This reduction in diameter is elastic, i.e. after the tensile force on said body has been eliminated during removal from the concrete, the body returns to its original form and can be reused, i.e. a cavity which corresponds to the exterior of the body can be produced in the concrete without significant damage to the external surface of the body. A body of this type can be used a large number of times. The cost of producing cavities drops as a result, while moreover the abovementioned method is particularly easy to employ. The body is easy to remove by hand.

One example of an elastomer material which has the properties described above is a polysiloxane material. This material undergoes considerable constriction when a tensile force is applied, and moreover has no tendency whatsoever to stick to the concrete material, so that removal from the partially set concrete material is possible with even only a slight reduction in the size of the cross section.

The above-described body may be hollow or solid and in any external peripheral form. Examples include round, oval and polygonal. In all cases, it is possible for an optionally hollow core, which consists of a material with a higher tensile strength than the elastomer wall of the body, to be present adjacent to the outer part of the body which is formed from the above-described elastomer material. An embodiment of this type is advantageous in particular for relatively great lengths. This core can take care of the bearing function. After all, if the body projects into a space unsupported over a considerable distance, as is the case when it is positioned prior to pouring into a formwork, some strength is required in order to prevent the body from being deformed or deviating from the desired position.

It is also possible for a permanent part which adjoins the removable body to be arranged in the poured concrete object, for example a connecting pipe between the passages or the connection to another surface.

Another possibility is to provide a further cavity which is connected to the cavity which is to be formed and in which the metal part is to be secured, which further cavity extends as far as a separating surface of the concrete part. As a result, the bonding material which has to provide the bond between the metal part and the wall of the cavity can be introduced.

The body may either consist entirely of an elastomer or may comprise a combination of a relatively rigid core with elastomer material arranged around it.

In a variant, it is possible for the core to be separable from the elastomer material. The removal of the core produces a large amount space for the elastomer material to move back from the partial setting of the concrete. This is important in particular in the case of complex formations. According to a further variant of the invention, it is possible to design the core to be expandable. As a result, the size of the core can be reduced after the concrete material has at least partially set and the core can readily be removed. In the vicinity of the periphery, the body may be provided with a reinforcement, such as a coil. The above-described mechanism wherein the diameter is produced during the application of force to the body can be used not only for removal of the body from set concrete but also to provide a seal between the body and the formwork.

Another option is to place the end face of the body against the formwork. By arranging a threaded bore in the end face (the core) or providing the latter with a projecting threaded part and producing a relatively small hole in the formwork, it is possible to fit either a bolt or the threaded stud through this hole and be supported on the other side of the formwork. The core is preferably only connected to the outer casing in the vicinity of the formwork end. When a tensile force is applied, the outer casing is gripped at the end and can easily be reduced in size. This reduction in size can in extreme circumstances be improved still further by providing the outer casing with a concertina-like profile on the inner side.

In all cases, it is important for the body to be designed in such a manner that it is not deformed by its own weight and/or weight of the concrete poured onto it. This means that, starting from securing to the formwork, the body has to be sufficiently strong and/or self-supporting for it not to be deformed or deviate from the desired position.

The method described above can be used to produce any conceivable type of cavity in a concrete material. A number of non-limiting examples will be given below.

It will be understood that it is possible to arrange a number of cavities next to one another in a single step. In such a case, the formwork has to be provided with a series of bodies (which may differ from one another) and which are then encased with concrete. These bodies can either be removed simultaneously or removed in succession. In a particular embodiment, a common bearing plate will be used. This bearing plate is placed against a formwork and, by providing the later with a particular profile, can likewise provide the concrete object which is to be formed with a particular profile, such as for example a V-shaped profile. A V-shaped recess obtained in this way can provide stabilizing functions when a further part is poured onto it. There are various uses for a successive number of cavities of this type. These cavities may be identical and/or different.

The invention also relates to a method for connecting two concrete parts to one another, comprising the steps of arranging a projecting connecting member, such as a reinforcing bar, in one of said concrete parts, providing said other concrete part with a cavity as described above, placing the concrete parts against one another, with said projecting member being placed into said cavity, and securing said projecting member in said cavity.

Therein the projecting member can be introduced into said one concrete part by producing a cavity in the manner described above and adhesively bonding or screwing it or connecting it in some other way into said cavity. A method of this type can be used to temporarily or permanently secure two or more concrete parts. Moreover, it can be used for temporary or permanent propping-up.

BRIEF DESCRIPTION OF THE DRAWINGS

The invention will be explained in more detail below on the basis of exemplary embodiments illustrated in the drawing in which.

DETAILED DESCRIPTION OF THE INVENTION

Figure 1:
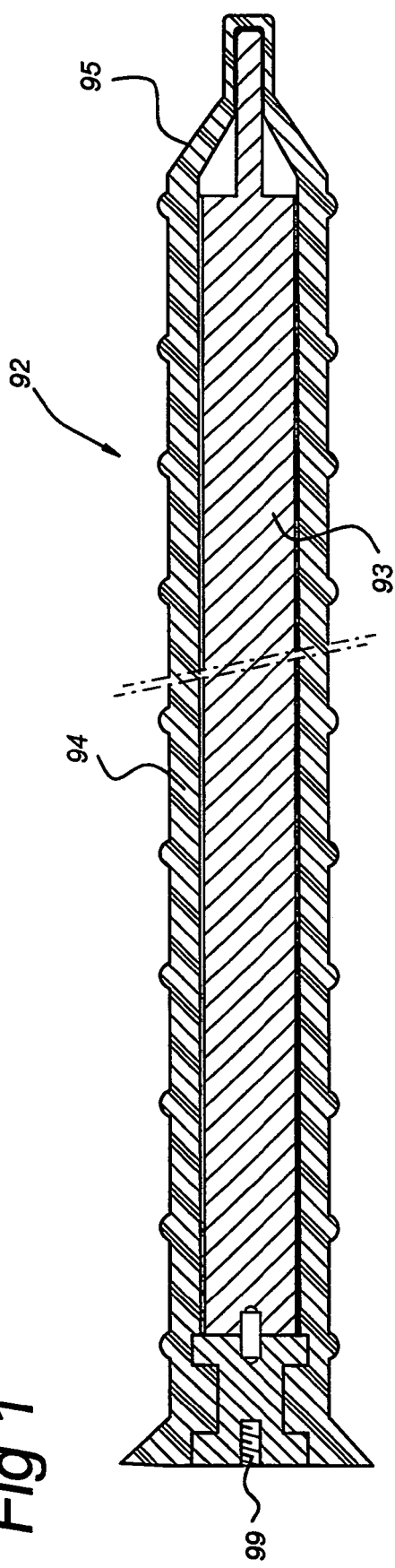
FIG. 1 diagrammatically depicts a first embodiment of the body for producing cavities in concrete parts.

In FIG. 1, a body for the production of cavities is denoted by 92. It comprises a metallic core 93 around which a rubber-like material 94 is arranged. This rubber-like material may comprise any material which is known in the prior art, such a polysiloxane material. This material has the particular feature that, when a low tensile force is applied to it, it undergoes considerable stretching, resulting in a considerable reduction in the cross section of the body 92. The rubber-like material used has a Shore A hardness of less than 40 and preferably of 20 or less. The external shape of the body 92 may be any desired form. That end of the body 92 which is denoted by 95 is of narrowed design. The other end is provided with a threaded part 99.

Depending on the embodiment, the core 93 may optionally be arranged so as to be removable with respect to the rubber-like material 24.

Figure 2:
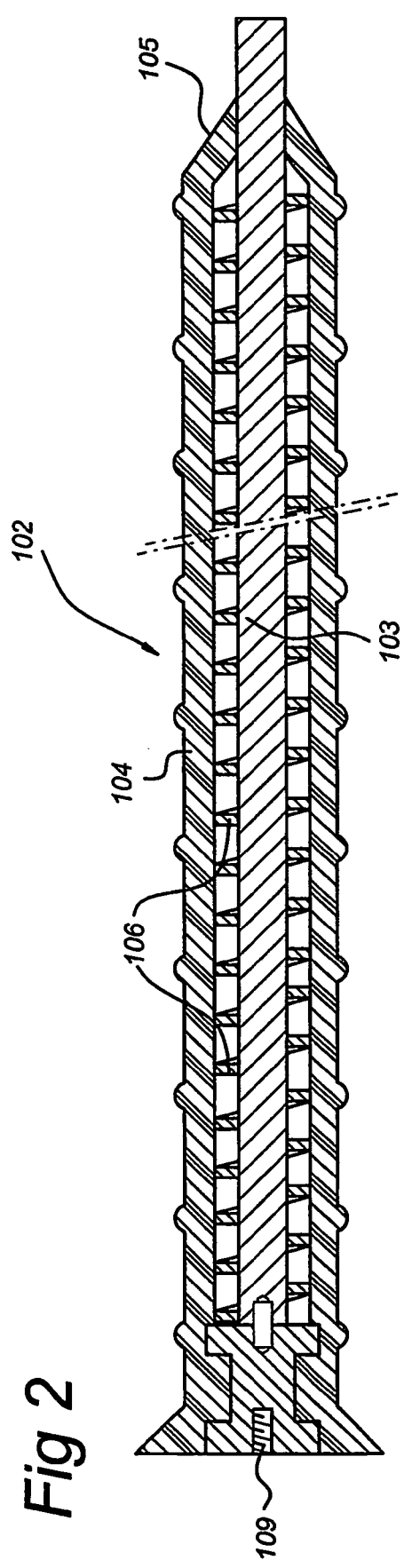
FIG. 2 shows a second embodiment of a body of this type.

FIG. 2 shows a variant of the structure shown in FIG. 1. The body is denoted overall by 102 and comprises a relatively rigid core, for example made from metallic material 103. The part made from rubber-like material is denoted by 104. A part having a number of spacers 106 is arranged between this piece of rubber-like material and the relatively rigid core. The narrowed end is denoted by 105 and the threaded part is denoted by 109.

Figure 3:
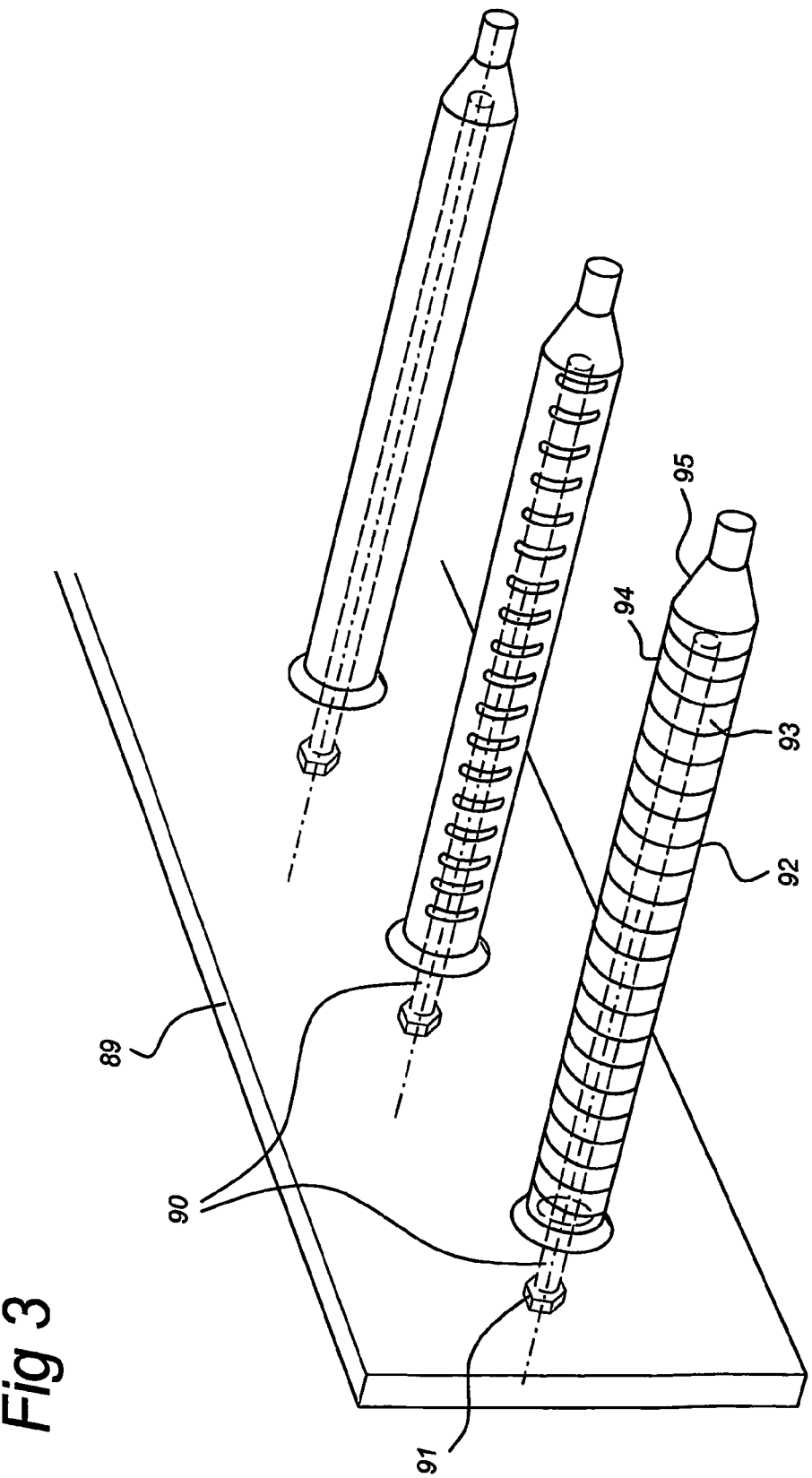
FIG. 3 shows the positioning of a series of bodies in a formwork in accordance with the invention.
Figure 4:
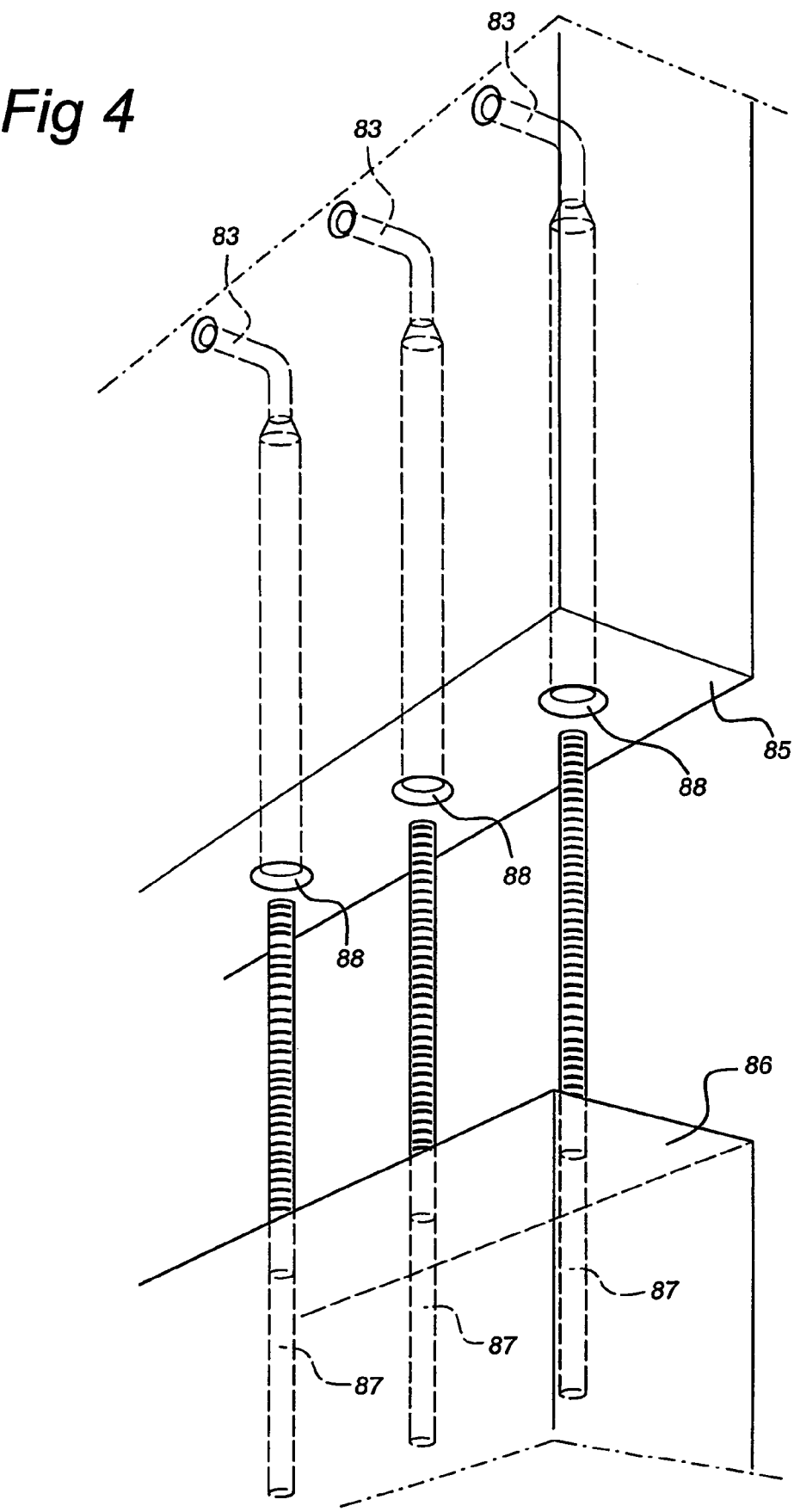
FIG. 4 shows the inventive way of putting together an assembly.

FIG. 3 and FIG. 4 show the use of the invention for coupling a concrete part 85 to a further concrete part 86 (FIG. 4) in more detail. This further concrete part 86 is provided with preferably single solid reinforcing bars 87 which are encased in concrete in a manner which is known from the prior art. However, according to a preferred embodiment, the method according to the invention is used to provide this part 86 with reinforcing bars, so that the two parts 85, 86 are delivered without reinforcement and with holes at the top. A series of, i.e. at least three and preferably at least ten, bars of this type are arranged in specific positions depending on the requirements set. They are to be arranged in cavities which are denoted by 88 and are produced in the concrete part. After or before introduction, the cavities are filled with a bonding material which forms an adhesive bond between the boundary of the cavities 88 and the reinforcing bars 87. A material of this type may comprise a pourable mortar or (two-component) synthetic resin or any other known bonding agent which is known from the prior art. The length of the freely projecting part of the reinforcing bars is preferably at least 20 cm.

According to present invention, the boundary wall of the cavities 88 is formed by concrete material, unlike in the prior art, in which the cavities are produced by boundaries made from another material. The cavities according to the invention are produced in the manner shown in FIG. 3. 89 denotes a formwork which may comprise any material that is preferably of metallic design, so that it can be used a number of times. This formwork is provided with a number of openings 90 which can either be closed off by stoppers or through which bolts 91 can extend. These bolts 91 extend from the outer side of the formwork toward the interior for fixedly securing bodies 92 and 102 with screw thread 99 and 109, respectively, in accordance with the present invention. After securing to the formwork, no further support for the bodies 92 or 102 is required, on account of the strength of the core, and concrete can be poured. After at least partial setting, first of all the bolts 91 are removed, followed by the removal of the formwork 89. Then, in the manner described above, the bodies 92 and 102 can be removed by the application of a tensile load to them. As has already been indicated above, the external rubber part, which does not stick to the concrete material, will undergo a considerable reduction in size with considerable stretching as a result of the application of a tensile load. It is also possible for cores 93 and 103 to be removed first, after which the rubber-like material 94/104 is particularly easy to remove. In this way, it is possible to provide cavities without the use of pipes or other auxiliary means. As a result, complicated structures with plug-connection receptacles and the like can be made considerably more easily.

As a result of the accurate positioning of the bodies 94, it is also possible to accurately fix the position of the cavities 88 with respect to the reinforcing bars. As a result, the cavities can be designed with a relatively small diameter and the narrowed region 95 serves to further center the reinforcing bars. As an alternative to reinforcing bars, it is also possible to arrange nut-like structures or other structures around the body 92 and/or 102. After the concrete has been poured in and partially) set, the body 92 and/or 102 can be removed, leaving behind the nut-like structure or the like in the concrete body.

In the exemplary embodiment illustrated in FIG. 4, the reinforcing bars 87 have been encased in the further concrete part 86. It should be understood that the technique of arranging cavities and then fixing the reinforcing bars therein described above can also be used for the further concrete part or concrete part which is still to be poured. This can take place in the manner described above with the aid, for example, of adhesive bonding. However, it is also possible for the encased bodies with an external surface made from rubber-like material which are then used to be provided with an external screw thread. As a result, the cavity in the concrete material is likewise formed with a screw thread into which reinforcing bars of this type or other structural parts can be screwed and fixed in place. Structures with walls cast onto them are also conceivable.

It will be immediately clear to the person skilled in the art from the variants described above that the invention can be implemented in a wide range of ways. Further variants will occur to the person skilled in the art on reading the above description and such variants lie within the scope of the appended claims.

The further part provided with projecting reinforcing bars is fitted into the openings 88. It is possible for these openings to be provided with a bonding material in advance. It is also possible for a material of this type to be applied subsequently. For this purpose, the openings are lengthened by a grouting hole 83. These can be formed, for example, by fitting a curved plastic pipe opening from the body in the formwork and leaving this pipe in place in the concrete after it has been encased. Adhesive material, such as a mortar, can be applied via this grouting opening 83. Of course, it is also possible for a material of this type to be introduced via opening 88.

As an alternative to a single further part from which reinforcing bars extend, it is possible of this further part simply to be provided with continuous cavities. After the part with blind cavities and the part with continuous cavities have been placed onto one another, with these cavities aligned, it is possible, for example, to place reinforcing bars in the cavity and for adhesive bonding material to be introduced (if appropriate in advance). This makes it possible to avoid expensive through-coupling systems.

The further concrete part described above may also comprise any other conceivable part and it is also possible for the cavity and the part which is to be introduced to be used or arranged in any desired position. In this context, consideration can be given to scaffolding/rail-securing means/exterior-panel anchoring means, anchoring means which interrupt thermal bridges and the like.

It is also possible for a holder made from plastic or some other type of material to be secured to the formwork, in which part of the body can be received, so that the body can be put in place without bolt connections through the formwork, or in special cases with magnets for example. Moreover, it is also possible for the body to be positioned at a defined angle in the formwork.

As an alternative to the formwork wall 98 shown in FIG. 1, it is also possible to provide a plate (or holder) on which the bodies 92 and 102 are arranged as a series. These bodies may then be identical or different in shape and may be at identical or different distances from one another. It is possible for a plate (or holder) of this type to be provided with a profile which, of course, will be transferred to the concrete which is to be poured. A plate of this type can be secured to the formwork in any desired way or may form part of the formwork.

If openings are being produced on the top side of a concrete body, i.e. at a location where no formwork is required, the bodies described above can be designed to float in the concrete with the aid of "floating structures".

The invention claimed is:

1. A method for coupling concrete parts, comprising the steps of:

providing a formwork, said formwork including an inner side;

placing a plurality of bodies against said inner side of said formwork, each of said bodies having a shape and including an elastomer material, each body being configured such that when a tensile force is applied to said body, a diameter of said body is reduced;

pouring and at least partially setting concrete material about said formwork and said bodies so as to form a first concrete part having a plurality of cavities formed therein, each cavity having a shape at least partially corresponding to the shape of one of said bodies and extending from an outer wall of said first concrete part, wherein the elastomer material of each of said bodies adjoins concrete material and then each of said bodies can be removed from said cavities by applying a tensile force to each of said bodies at the outer wall of said first concrete part;

detaching said formwork and said bodies from said first concrete part;

providing metal reinforcing bars which are receivable within the cavities in said first concrete part; and securing said reinforcing bars in said cavities, said securing step including filling a space within each cavity between said metal reinforcing bars and said first concrete part with a material which bonds to said reinforcing bars and to said first concrete part, said metal reinforcing bars being encased in the concrete of a second concrete part.

2. The method as claimed in claim 1, wherein at least one of said plurality of bodies is externally provided with a profiling.

3. The method as claimed in claim 1, wherein said securing step comprises the step of screwing at least one of said metal reinforcing bars into a screw thread arranged in at least one of said cavities.

4. The method as claimed in claim 3, wherein said screw thread comprises an encased threaded part.

5. The method as claimed in claim 1, wherein at least one of said bodies is secured to the inner side of the formwork.

6. The method as claimed in claim 1, wherein said first concrete part is poured in a factory remote from its final destination.

7. The method as claimed in claim 1, wherein said metal reinforcing bars comprise reinforcing steel.

8. The method as claimed in claim 1, wherein said elastomer material comprises a polysiloxane material.

9. The method as claimed in claim 1, wherein at least one of said bodies comprises a core made from a material with a higher tensile strength than a wall of the body and is provided with a supporting surface and is self-supporting.

10. The method as claimed in claim 1, wherein at least one of said bodies is provided, at an end thereof, with a securing element for securing the body to said formwork.

11. The method as claimed in claim 1, wherein at least one of said bodies is provided with a series of projections which, when fitted into said formwork, extend at a distance from an end of one of said cavities opening out at said outer wall of said first concrete part.

12. The method as claimed in claim 11, wherein said projections comprise an external screw thread.

13. The method as claimed in claim 1, in which at least one of said bodies is provided with a receiving means for a part which is to be encased, and after the concrete material has set, said part which is to be encased remains behind in the set concrete material when said body is removed.

14. The method as claimed in claim 1, wherein at least one of said bodies comprises a core with the elastomer material arranged around the core, and wherein the step of detaching said body from said first concrete part comprises firstly removing the core, followed by removing the elastomer material.

* * * * *